United States Patent [19]

Kubo et al.

[11] 4,438,073
[45] Mar. 20, 1984

[54] VAPOR PHASE POLYMERIZATION APPARATUS FOR OLEFINS

[75] Inventors: Kunimichi Kubo, Tokyo; Yasunosuke Miyazaki, Machida; Mamoru Yoshikawa, Kawasaki; Mituji Miyoshi, Kanagawa, all of Japan

[73] Assignee: Nippon Oil Company, Ltd., Tokyo, Japan

[21] Appl. No.: 315,616

[22] Filed: Oct. 28, 1981

[30] Foreign Application Priority Data

Oct. 31, 1980 [JP] Japan .................. 55-152224

[51] Int. Cl.³ .......................... B01J 12/02
[52] U.S. Cl. ....................... 422/135; 422/131; 422/137; 422/138; 422/225; 422/231; 422/234
[58] Field of Search .............. 34/57 D; 422/131, 135, 422/137, 143, 311, 231, 234, 138; 264/122

[56] References Cited

U.S. PATENT DOCUMENTS

| | | | |
|---|---|---|---|
| 2,220,193 | 11/1940 | Ahlmann | 34/57 D |
| 2,803,528 | 8/1957 | Erdmann | 422/311 |
| 3,463,617 | 8/1969 | Takeuchi | 422/143 |
| 4,101,289 | 7/1979 | Jezl et al. | 422/135 |
| 4,159,307 | 6/1979 | Shigeyasu et al. | 422/131 |

FOREIGN PATENT DOCUMENTS 1267397  3/1972  United Kingdom .......... 34/57 D

*Primary Examiner*—Michael S. Marcus
*Attorney, Agent, or Firm*—Austin R. Miller

[57] ABSTRACT

A horizontal agitation bed type vapor phase polymerization apparatus for olefins provided on its lower curved surface with plural cells each having an opening facing on the polymerization reaction system and further having small holes formed in its side wall portion for feeding a starting olefin gas.

7 Claims, 7 Drawing Figures

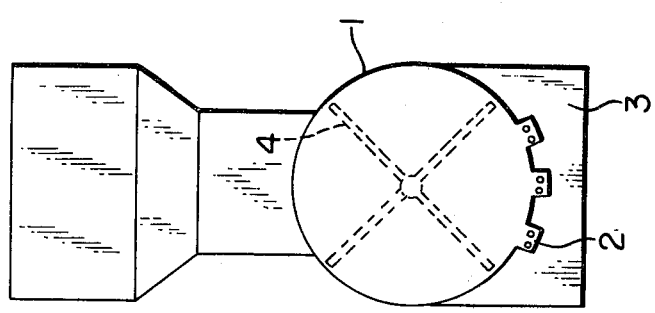
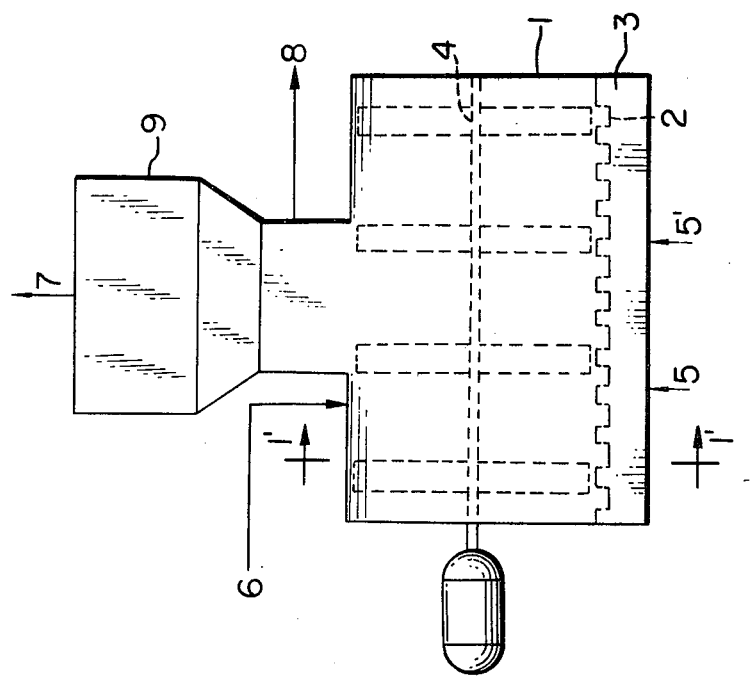

VAPOR PHASE POLYMERIZATION APPARATUS FOR OLEFINS

BACKGROUND OF THE INVENTION

This invention relates to a vapor phase polymerization apparatus for olefins.

The vapor phase polymerization method has recently been attracting attention as a polymerization method for olefins, but in the case of using conventional vapor phase polymerization apparatus it is difficult to avoid problems peculiar to the vapor phase polymerization method such as the formation of hot spots, and a stable and economical manufacture of polymers of good quality has not been attained yet. Conventional vapor phase polymerization apparatus for olefins are broadly classified into a vertical fluidized bed type and a horizontal agitation bed type, but in the former type the use of some particular kinds of catalysts is liable to afford popcorn-like, flake-like or block-like polymers, and although the polymerization heat is removed by recycling gaseous components it is said that a considerable cost is required for the recycle of gaseous components, while as the latter type apparatus there are known, for example, the apparatus disclosed in Japanese Patent Publication No. 2019/70 and Laying Open Print No. 86584/76, but in both apparatus it is difficult to completely prevent the formation of hot spots and to prevent the formation of block-like polymers, and a large amount of power is required for the agitation.

SUMMARY OF THE INVENTION

It is an object of this invention to provide a horizontal agitation bed type vapor phase polymerization apparatus for olefins.

It is another object of this invention to provide a polymerization apparatus having few if any hot spots during polymerization and consequently the formation of block-like polymers can be suppressed, the power required for agitation is small, and a polymer having a suitable particle size distribution can be prepared stably and economically.

It is a further object of this invention to provide a polymerization apparatus of high utility capable of feeding gaseous components containing olefin gas as the essential starting material into the polymerization apparatus more stably and uniformly.

Other objects and advantages of this invention will become apparent from the following description.

The aforesaid objects of this invention can be attained by a vapor phase polymerization apparatus for olefins constituted by a horizontal type hollow, cylindrical vessel having a centrally located driving shaft wherein a plurality of cells are attached to the lower portion of the vessel, the upper portion of each of the cells being open to the inner surface of the lower portion of the vessel and each of the cells being provided at least in its side wall portion with small holes for feeding a starting olefin gas into the vessel.

The vapor phase polymerization apparatus of this invention is characterized in that a plurality of cells provided at least in its side wall portion with small holes for feeding gaseous components containing olefin gas as the essential starting material into the polymerization system are mounted so that their upper portions are open to the inner surface of the lower portion of a horizontal type hollow cylindrical vessel which constitutes the polymerization system. Those cells usually are disposed at regular intervals on the lower portion of the horizontal type hollow cylindrical vessel and they communicate through their small holes with a starting olefin feed chamber which is formed so as to cover throughout those cells. The vapor phase polymerization apparatus of this invention usually has a gas flow velocity reducing chamber mounted on top of the horizontal type hollow cylindrical vessel, an olefin and other gases discharge port for discharging and recycling unreacted olefin and other gases through the gas flow velocity reducing chamber, a polymerization catalyst introducing port and a resulting polymer discharge port.

BRIEF DESCRIPTION OF THE DRAWINGS

This invention will be described hereinunder with reference to the accompanying drawings.

FIG. 1 is a schematic sectional view of a vapor phase polymerization apparatus for olefins according to an embodiment of this invention, wherein (a) shows a longitudinal section of the same apparatus and (b) is a transverse sectional view thereof taken on line 1'—1' of (a).

FIGS. 2 through 4 are schematic views each showing an example of a cell having olefin gas feed holes, the provision of the cell being a feature of this invention. FIG. 3 is a longitudinal sectional view, and FIG. 4 is a partially sectional perspective view.

DESCRIPTION OF THE PREFERRED EMBODIMENTS

Figure 2A:
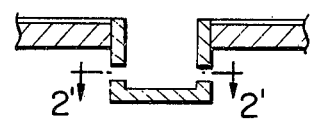
FIG. 2(a) is a longitudinal sectional view.

Referring to FIG. 1, in the apparatus of this invention, the body of a reaction vessel is constituted by a vessel 1 having a horizontal, hollow, cylindrical structure. The ratio of length to the diameter of a vertical section of the interior of the hollow cylinder is not specially limited, but usually it is in the range of from 0.5 to 10, preferably 1 to 5.

One feature of the apparatus of this invention, as previously noted, resides in that cells 2 having olefin gas feed holes are provided at the lower portion of the cylindrical vessel 1, the cells 2 communicating with an olefin feed chamber 3. A starting olefin is fed through pipes 5, 5' into the olefin feed chamber 3.

The reference numeral 4 designates an agitator having a driving shaft which is centrally positioned in the longitudinal direction of the cylindrical vessel, and also having one or more agitation blades. As the agitation blade there may be used paddle type, inclined paddle type, spiral type, and one having a scraper for scraping the inner wall of the polymerization apparatus. One or more agitation blades may be used; for example, 2 to 12 agitation blades are mounted on plural points of the driving shaft.

Numerals 6 and 8 designate a polymerization catalyst introducing pipe and a resulting polymer discharge port, respectively. The polymerization catalyst introducing pipe 6 and the resulting polymer discharge port 8 may be disposed in any other positions than the perforated portion of the polymerization apparatus, but usually, as shown in the figure, the former is attached to the upper portion of the cylindrical vessel, and the latter is formed on the upper portion of the same vessel or at a side end portion thereof. The apparatus of this invention may be further provided with a hydrogen introducing port if necessary. The hydrogen introducing port may be independently provided, or the olefin feed chamber or the catalyst introducing port may be allowed to function as a hydrogen feed chamber or a hydrogen introducing port. Particularly, it is a preferable mode to feed hydrogen through the perforated portion from the olefin feed chamber, and in this case hydrogen is introduced into the olefin feed chamber through the same piping system as that for olefin. Furthermore, there may be formed a cooling liquid introducing port for control of the polymerization temperature, and also in this case the cooling liquid introducing port may be independently provided, or cooling liquid may be fed through the catalyst introducing port. It is particularly preferred to introduce the cooling liquid as a spray from the upper portion of the cylindrical vessel. Of course, modifications may be made; for example, a partition plate may be disposed within the polymerization reaction vessel, or the olefin feed chamber may be provided in a plurally divided form. On the upper portion of the cylindrical vessel 1 there is disposed a gas flow velocity reducing chamber 9, and a gas discharge port for discharging and recycling unreacted olefin and other gases flowing through the gas flow velocity reducing chamber 9. The gas discharge port is disposed preferably on top of the chamber 9. The gas flow velocity reducing chamber 9 may assume any shape, say, an inverted truncated cone or a hopper as shown in the figure, and preferably the chamber 9 has a portion of wider sectional area than that of the connection with the polymerization vessel body, namely, the hollow cylindrical vessel. Preferably, moreover, the capacity of the gas flow velocity reducing chamber is 0.5 to 3 times that of the hollow cylindrical vessel, and the sectional area of the connection with the hollow cylindrical vessel is 0.4 to 1 times as large as the vertical sectional area of the hollow cylindrical vessel.

Figure 2B:
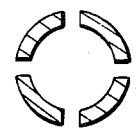
FIG. 2(b) is a transverse sectional view taken on line 2'-2' of (a)
Figure 3:
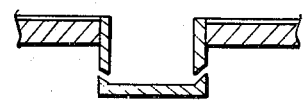
Figure 4:
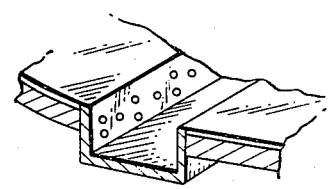

As shown in FIGS. 2–4, the olefin gas feed holes are formed in the side wall portion of the cell, so even if they are of a larger diameter than the resulting polymer powder, the powder is difficult to drop outside the polymerization system. Preferably, the hole diameter ranges from about 1.5 to 10 mm, more preferably from about 2 to 6 mm. These holes may be slantwise formed as shown in FIG. 3, or a bubble cap may be attached inversely. The cell may assume any desired shape provided the diameter of its opening portion and its depth range preferably from about 6 to 50 mm, more preferably from about 8 to 25 mm, respectively. As shown in FIG. 4, moreover, the cell may be in the shape of a long groove formed so as to cross the lower portion of the cylindrical vessel transversely or longitudinally. The number of olefin gas feed holes to be formed in each cell differs according to the size and shape of the cell, but in the case of such cells as shown in FIGS. 2 and 3, usually 2 to 8 holes are preferred. And the spacing between cells is preferably about 50 to 300 mm, more preferably about 50 to 200 mm, most preferably about 100 to 200 mm.

By the provision of such cells at the lower portion of the cylindrical vessel, not only the dispersion of gas into the polymerization vessel becomes uniform, but also it becomes easier to obtain an appropriate opening ratio, so that the pressure loss and the gas recycling energy can be diminished. At a standstill, moreover, the resulting polymer powder does not drop through the cell, and the agitation efficiency is improved. By way of comparison, in case a perforated plate having small holes is attached to the lower portion of the cylindrical vessel, it is necessary for obtaining an appropriate opening ratio that 3000 to 11,000 holes each having a diameter of not larger than 1.5 mm be formed per square meter. This is uneconomical from the standpoint of manufacture.

The portion of the cylindrical vessel where the cells are to be mounted according to this invention are the lowest portion and its adjacent curved portion, it being preferable that the cells be formed on the curved portion corresponding to about 30° to 180°, particularly 60° to 120°, in terms of an angle from the center of the cylindrical vessel.

Figure 5:
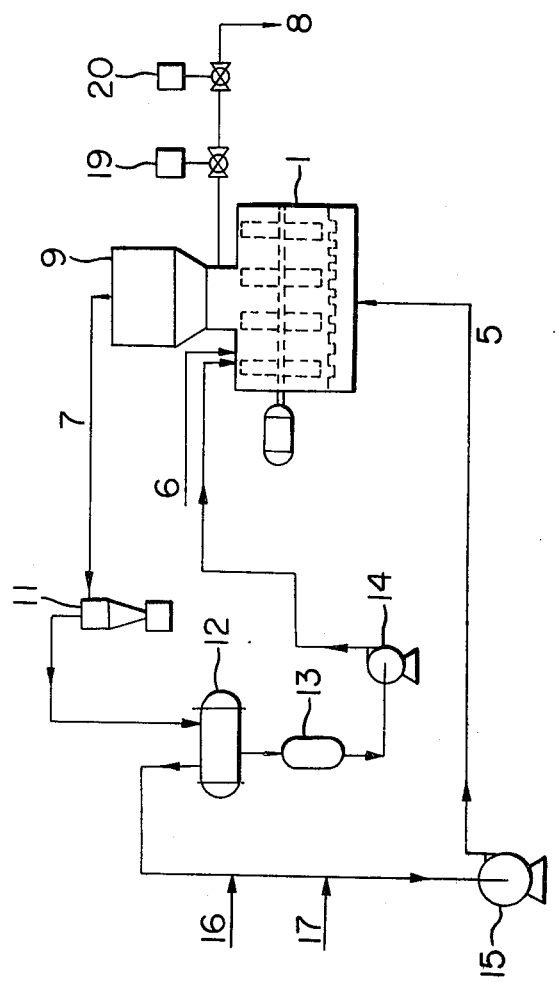
FIG. 5 is a schematic flow sheet showing an example of polymerization of olefins using the apparatus of this invention.

Referring to FIG. 5, a catalyst is fed usually as a slurry of a saturated hydrocarbon or as a solid. A promotor may be added simultaneously or separately. To prevent the blocking of the catalyst introducing port, it is preferable to feed hydrogen or nitrogen gas. A starting olefin is fed continuously in a gaseous state from the olefin feed chamber through the perforated portion into the reaction vessel. In this case, hydrogen is also fed as necessary. The resulting polymer which overflows from the reaction vessel is withdrawn to the outside 8 of the system successively or intermittently by an intermittent switching of ball valves 19 and 20. Unreacted olefin and other gases go through a cyclone or filter 11 to remove solids, then through a cooler 12 wherein the cooling liquid is liquefied and separated, and thereafter the gases are fed again from the olefin feed chamber into the reaction vessel through the pipe 5 by means of a gas recycling blower 15. The separated cooling liquid is stored in a tank 13 and then fed again to the reaction vessel. For making up the olefin and hydrogen consumed in the reaction, olefin and hydrogen are fed through pipes 16 and 17, respectively. The apparatus of this invention may be connected in plural numbers to carry out the vapor phase polymerization reaction.

As starting olefins there may be used α-olefins having 12 or less carbon atoms such as ethylene, propylene, butene-1, hexene-1 and 4-methylpentene-1, alone or in combination. These olefins may be copolymerized with dienes such as butadiene, 1,4-hexadiene and ethylidene norbornene. These starting olefins are fed through the recycle system with or without hydrogen, and in this case the composition of recycle gases may be suitably chosen according to object polymers.

The temperature of the reaction vessel ranges from about 0° to 125° C., preferably from about 20° to 100° C., and the pressure ranges from about atmospheric pressure to 70 kg/cm$^2$.G, preferably from about 2 to 60 kg/cm$^2$.G. The revolution of the agitator ranges from about 10 to 500 rpm, preferably from about 20 to 300 rpm, and the linear velocity of recycle gases in the reaction vessel ranges from about 0.5 to 25 cm/sec, preferably from about 1 to 10 cm/sec, on a sectional area basis.

As a catalyst there may be used conventional catalysts usually employed in the manufacture of polyolefins, such as Ziegler type, Phillips type and Standard type catalysts.

When a vapor phase polymerization of olefins is performed using the apparatus of this invention, the powder within the polymerization system becomes fluidized uniformly and moderately with the result that the agitation torque required becomes smaller and particularly the starting of the agitator becomes very easy. Moreover, by virtue of a synergistic effect of fluidization and agitation, it becomes easier to suppress the formation of hot spots and there is obtained a polymer having a suitable particle size distribution without incorporating a block-like polymer. Additionally, a polymer of a high quality is obtainable safely and efficiently while suppressing the scattering of powder. Furthermore, the removal of the polymerization heat becomes very easy since the fluidization can be effected with low temperature gases, and the removal of the polymerization heat which utilizes the vaporization heat of butane and other cooling liquid is also adoptable at the same time if required. Thus, by using the apparatus of this invention, gases can be fed uniformly from the wide lower area of the apparatus and various effects are thereby obtained. Particularly, the olefin gas feed cells in this invention are not an obstacle at all to the rotating agitation blades, and in comparison with the use of a simple perforated plate the number of olefin gas feed holes to be formed is smaller whereby an equal or even superior effect can be attained.

EXAMPLE 1

There was used a 40 liter, horizontal type fluidized-agitation bed polymerization reaction vessel such as that shown in FIG. 1. To the lower portion of this reaction vessel there were attached fourteen cells such as that shown in FIG. 2 each having a diameter of 16 mm and a depth of 17 mm, with six 3 mm-dia. holes being formed in the side wall portion of each cell.

Gases were recycled through a loop comprising the above reaction vessel, a cyclone, a cooler, a blower and a flow rate adjuster, as is shown in FIG. 5. The temperature of the reaction vessel was adjusted by passing warm water through the jacket.

1 kg. of anhydrous magnesium chloride, 50 g. of 1,2-dichloroethane and 170 g. of titanium tetrachloride were subjected to ball milling for 16 hours at room temperature in a nitrogen atmosphere to allow the titanium compound to be supported on the carrier. The resulting solid substance contained 35 mg. of titanium per gram thereof.

8 kg. of a dried polyethylene powder was placed beforehand in the reaction vessel and the temperature of the reaction vessel was adjusted to 80° C., into which was then fed a catalyst slurry consisting of 300 mg. of the above solid substance and 6 mmol of triethylaluminum dispersed in 1 l of hexane through the line 6 at a rate of 300 ml/hr. Hydrogen and a mixture of ethylene and butene-1 were fed through the lines 16 and 17, respectively, while adjusting the hydrogen/ethylene mole ratio to 0.18 and the butene-1/ethylene mole ratio to 0.24 in the vapor phase, and the gases within the polymerization system were recycled at a rate of 30 $m^3$/hr by means of the blower. Paddle type agitation blades were mounted in the reaction vessel whereby agitation was made at a revolution of 120 rpm, and polymerization was carried out at a total pressure of 8 $kg/cm^2$.G.

The resulting polymer was withdrawn periodically during polymerization, and after 72 hours the polymerization was terminated in a normal manner to yield 119 kg. of a white polyethylene (except the polyethylene pre-charged in the reaction vessel) having a melt index of 0.30, a density of 0.9195 and a bulk density of 0.30.

The reaction vessel was then opened and its interior was checked; as a result, the adhesion of polymer was not recognized at all.

What is claimed is:

1. In a vapor phase polymerization apparatus for olefins constituted by a horizontal type hollow cylindrical vessel having a centrally located driving shaft, the improvement comprising a plurality of cells whose upper portions are open to the inner surface of the lower portion of said vessel, said cells having vertical side walls extending downwardly from the curved bottom wall of the vessel, means defining small holes in said vertical side walls and means for feeding a starting olefin gas into said vessel through said cells.

2. An apparatus according to claim 1, wherein said small holes formed at least in the side wall portion of each said cell are each about 1.5 to 10 mm in diameter.

3. An apparatus according to claim 1, wherein the opening portion of each said cell is about 6 to 50 mm in diameter and about 6 to 50 mm in depth.

4. An apparatus according to claim 1, characterized by further including a gas flow velocity reducing chamber mounted on an upper portion of said vessel, an olefin gas discharge port for discharging and recycling unreacted olefin gas through said gas flow velocity reducing chamber, a polymerization catalyst introducing port, and a resulting polymer discharge port.

5. An apparatus according to claim 1 or claim 4, wherein said cells are disposed at intervals of about 50 to 300 mm on a lower curved surface portion of said horizontal type hollow cylindrical vessel corresponding to an arc of a circle defined by an angle of about 30 to 180 degrees from the center of said vessel.

6. An apparatus according to claim 4, wherein the capacity of said gas flow velocity reducing chamber is about 0.5 to 3 times the capacity of said horizontal type hollow cylindrical vessel.

7. In an apparatus for the vapor phase polymerization of olefins while substantially preventing the formation of a block-type polymer, the apparatus having a horizontal hollow cylindrical vessel with a centrally located drive shaft operating an agitator, the improvement comprising a plurality of cells having upper portions open to the inner surface of a lower portion of the vessel, and having vertical side walls extending downwardly from the curved bottom wall of the vessel, means defining small holes in said vertical side walls of said cells and means for feeding a cooling gas into the vessel through said cells.

* * * * *